H. H. CUMMINGS.
REVOLUTION COUNTER.
APPLICATION FILED AUG. 28, 1912.
1,223,039.
Patented Apr. 17, 1917.
5 SHEETS—SHEET 2.
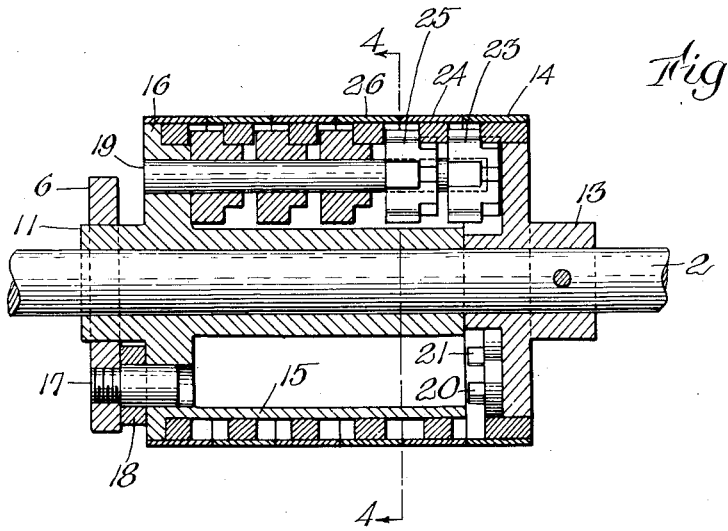
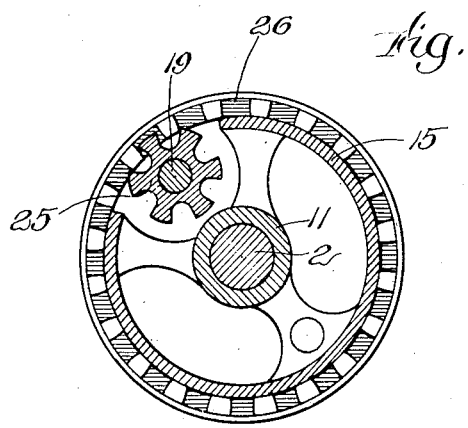
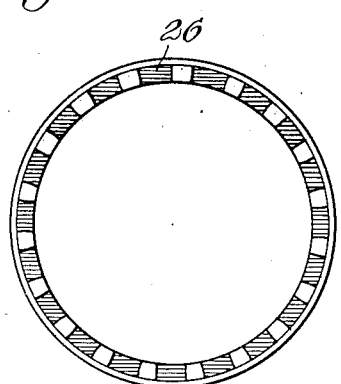
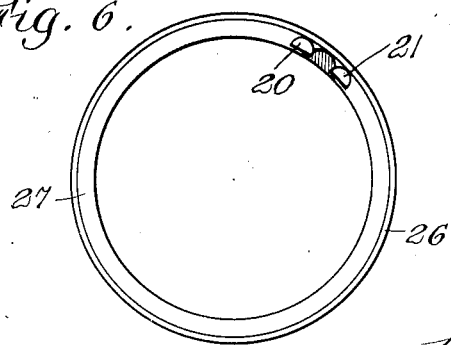
Witnesses:
Edward Maxwell
James R. Hodder
Inventor:
Henry H. Cummings,
by Geo. H. Maxwell,
Attorney.

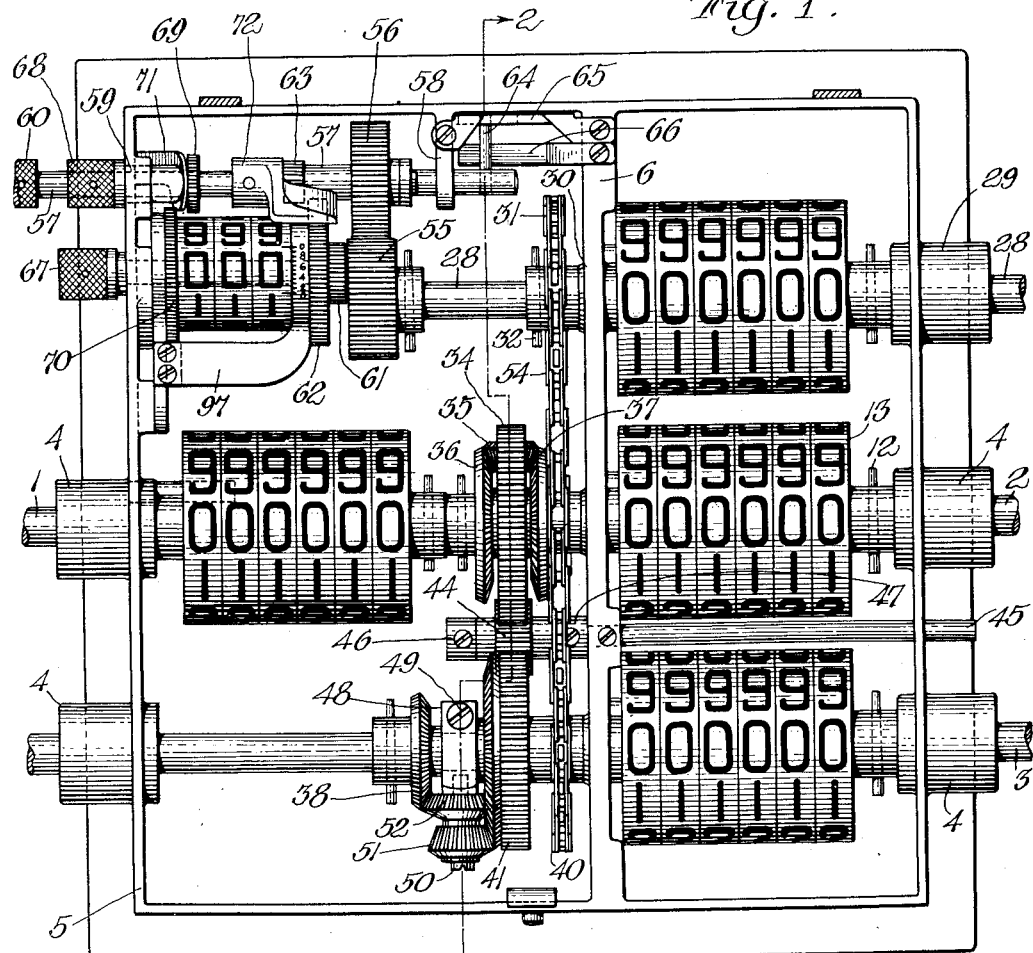

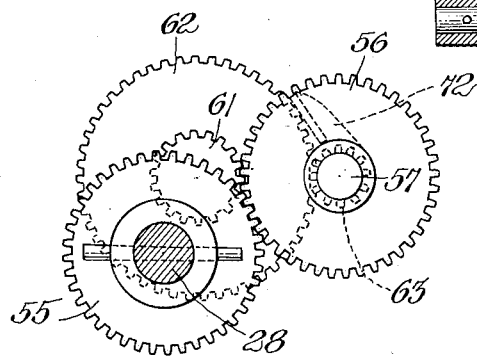
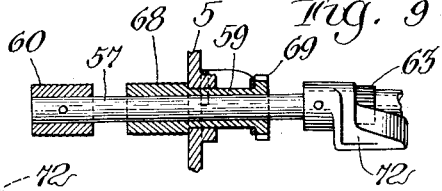
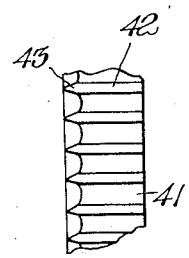
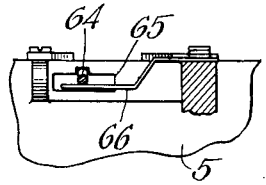
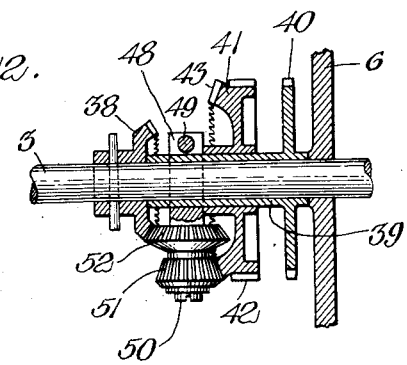
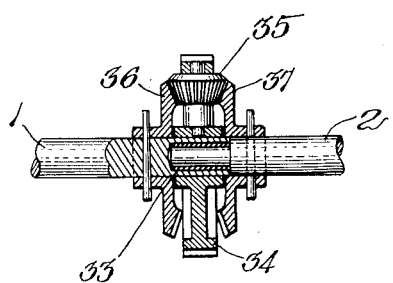

H. H. CUMMINGS.
REVOLUTION COUNTER.
APPLICATION FILED AUG. 28, 1912.
1,223,039.
Patented Apr. 17, 1917.
5 SHEETS—SHEET 4.
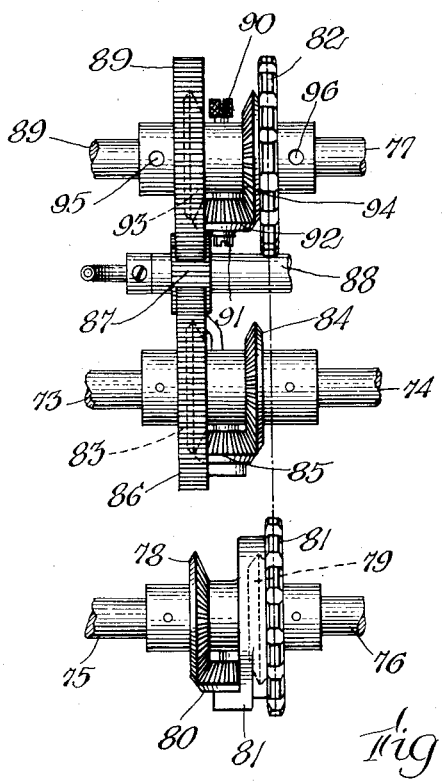
Fig. 14.
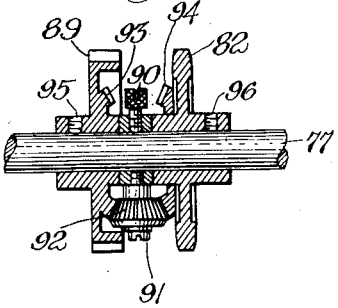
Fig. 15.
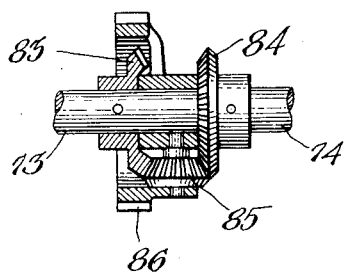
Fig. 16.
Fig. 17.
Witnesses:
Edward Maxwell
James R. Hodder
Inventor:
Henry H. Cummings,
by Geo. J. P. Maxwell,
Attorney.

H. H. CUMMINGS.
REVOLUTION COUNTER.
APPLICATION FILED AUG. 28, 1912.

1,223,039.

Patented Apr. 17, 1917.
5 SHEETS—SHEET 5.

UNITED STATES PATENT OFFICE.

HENRY H. CUMMINGS, OF NEWTON, MASSACHUSETTS.

REVOLUTION-COUNTER.

1,223,039.  Specification of Letters Patent.  Patented Apr. 17, 1917.

Application filed August 28, 1912. Serial No. 717,453.

*To all whom it may concern:*

Be it known that I, HENRY H. CUMMINGS, a citizen of the United States, and resident of Newton, county of Middlesex, and State of Massachusetts, have invented an Improvement in Revolution-Counters, of which the following description, in connection with the accompanying drawings, is a specification, like letters on the drawings representing like parts.

This invention relates to revolution counters or indicators and more particularly to means for obtaining and indicating the average revolutions of several revolving members as well as the average revolutions per minute of several such members.

It is an especial object of my invention to provide an accurate and efficient counter and indicator which shall not only indicate the revolutions of each of several rotating members but which will also automatically count and indicate accurately the average number of revolutions of a plurality of such members, whether all said members are actually in rotation, whether they are moving in the same or different directions, and whether they are moving at the same or at different rates of speed. My invention comprises means to count and indicate the resultant average revolutions of a plurality of rotating members irrespective of their individual directions or rates of movement and this feature of the invention, so far as I am aware, is broadly new and I desire to claim it broadly.

A further important object of the invention is to provide means which shall count and indicate the number of revolutions per minute of one or the average of a plurality of rotating members during any predetermined space of time. Thus if it is desired to note the average revolutions of a plurality of revolving parts and to count and indicate such average revolutions per minute, quickly, in a less time than one minute, as thirty seconds, my invention contemplates means to so count and indicate such an average, irrespective of whether the several rotating members are moving in the same or in different directions and at the same or at different speeds or if some only of said members are in motion and the other or others are at rest.

A further feature of the invention is the provision of means to count and indicate the average revolutions per minute of one or of a plurality of revolving members such average to be the resultant of a greater length of time than one minute such for example as counting and indicating the average revolutions for one minute during a period of five minutes. These features of the invention whereby the average revolutions per minute of one or more revolving parts is counted or indicated for a less period or a greater period, or any predetermined space of time is also believed to be a distinct novelty in the art to which this invention relates and it is desired to claim these features broadly.

The advantages of thus counting and indicating the average revolutions per minute, and of counting and indicating the average revolutions per minute during any predetermined space of time, of a plurality of rotating members is of great importance. Thus, for example, in the modern naval vessel where it is customary to have three, or even four, propelling shafts and screws,— it is customary and necessary to count the revolutions of each shaft as the speed of the vessel is usually reckoned with accuracy from the revolutions of the propelling shafts and my invention therefore which automatically counts and indicates the average revolutions of several shafts as well as the average revolutions per minute, saves all the calculating and mathematical averaging formerly required as well as the time involved in such calculations and thus indicates instantly the desired average results with perfect accuracy. Also the average revolutions per minute can be obtained almost as quickly viz. in thirty seconds. It will be readily understood that in maneuvering a fleet of vessels at sea the accuracy and effectiveness of such maneuvers will be greatly facilitated by the average indicator and counter of my invention connected to the propelling shafts of each ship. In time of war when every second is of the utmost importance and when there is little or no time for mathematical calculations the value of my invention which produces the desired resultant average instantly and without chance for error will be manifest.

In the preferred embodiment of my invention, as herein illustrated I have provided a plurality of counters or indicators adapted to be operatively connected with the corresponding number of the propelling shafts of a ship, each indicator serving as a counter for the revolutions of its respective propelling shaft and an additional average counter so connected with the actuating member of each individual indicator as to operate the average counter with a motion exactly equivalent to the resultant average of all the other shafts, irrespective of their directions of movement and rates of speed. Thus if all the shafts are going in one direction but at different speeds so as to drive the ship ahead,—my invention includes such compensating and differentiating means as to give the resultant average. If one engine is moving to drive the vessel ahead and two others are reversing to drive the ship astern then the resultant average, whether to produce a forward or backward movement or to hold the ship stationary, will be automatically indicated by the average counter. If one engine is going at a speed in one direction sufficient to more than counteract the slower speeds of the other engines in the reverse direction then such average resultant will be indicated.

In devices of this class it is usually desirable to have an indicator showing the revolutions per minute operable at will and therefore I have shown herein means to throw the average indicator showing revolutions per minute into a series of operative connections with the actuating part of the average indicator and to enable such revolutions per minute to be set to indicate the average either for a less time than a minute viz. thirty seconds, or for a greater time than one minute viz. for five minutes.

A still further feature of the invention consists in the arrangement and position of the indicating rings and of the actuating and resetting mechanism for the indicator which counts the revolutions per minute, as will be hereinafter explained.

Although my invention is herein described as preferably applicable to the several propelling shafts of a ship, it is of course not limited to such use but may be employed to count and indicate the average number of movements of a plurality of any moving members, such as oscillating, vibrating, etc., in addition to rotating members such as shafts.

Further novel features of the invention, details of construction and combinations of parts will be hereinafter more particularly defined and claimed.

In the drawings wherein a preferred embodiment of the invention is illustrated,

Figure 1 is a plan view of the indicators for three shafts in operative connection with an average counter and with a counter to indicate the revolutions per minute during a specified length of time;

Fig. 2 is a cross section on the line 2—2 of Fig. 1;

Fig. 3 is an enlarged detail of one of the counting mechanism;

Fig. 4 is a view in cross section on the line 4—4 of Fig. 3;

Figs. 5 and 6 are detailed views of the indicator rings; and

Fig. 7 shows the star wheel to actuate the rings;

Figure 18:
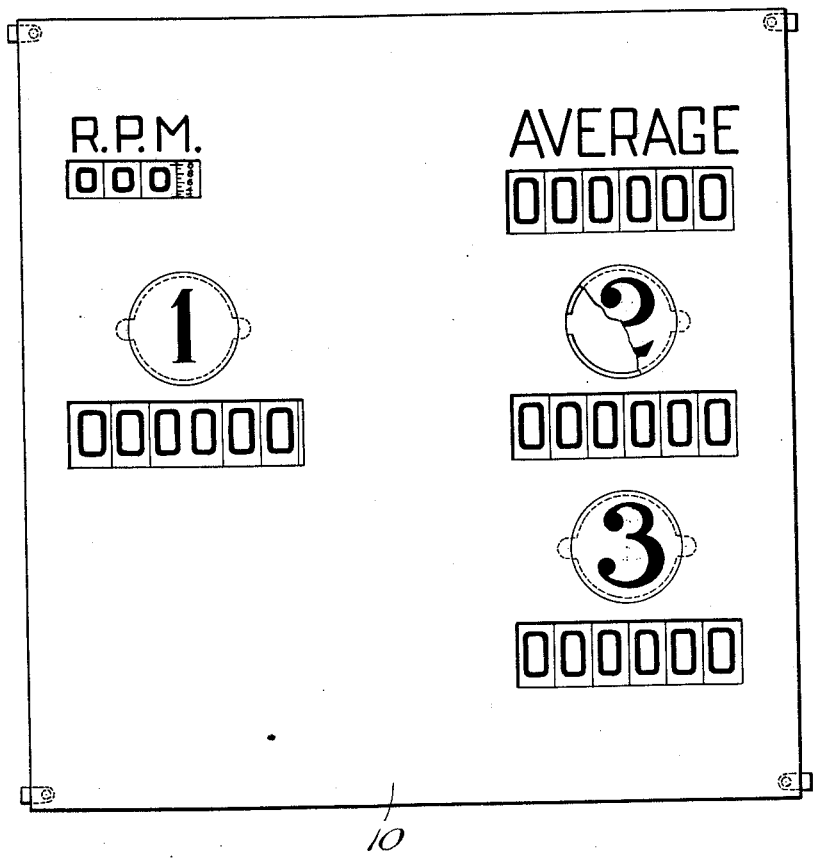

Figs. 8, 9, and 10, illustrate details of the mechanism for determining the average revolutions per minute; and Fig. 11 is a fragment of a differential gear; and Fig. 12 shows the differential gear to transmit the average of the three shafts to the average indicator; while Fig. 13 illustrates the compensating device to determine and transmit the average of two indicators;

Fig. 14 illustrates the compensating and differentiating transmission mechanism to determine the average of four indicators and their respective shafts;

Figs. 15, 16, 17 are details partly in cross section of the modification shown in Fig. 14;

Fig. 18 is a plan view of the cover for the box containing the indicators shown in Fig. 1.

In a preferred embodiment of the invention, illustrated in the drawings I have shown a series of three indicators, to be connected with three revolving shafts and the average indicator to determine the resultant average of said three indicator shafts and the whole mechanism being inclosed in a suitable compact square box to be positioned in the chief engineer's department of a vessel. Such compartment is usually adjacent the engine room so that any suitable means to connect the propelling shafts with the respective shafts to actuate the several indicators may be easily and conveniently effected. It is usual to designate the engines of a triple screw vessel for example as numbers 1, 2 and 3 and the respective rotation indicators may be similarly designated and named according to the propelling shafts with which they may be connected. Therefore as herein shown the rotation counters or indicators 1, 2 and 3, intended to be operatively connected to propeller shafts numbered 1, 2 and 3 are suitably journaled in bosses 4 in the sides of the box or receptacle 5 and in the transverse partition 6. The connection between the shafts 1, 2 and 3 and their respective engine shafts is not shown but would be made outside the box 5, such connection being of any well known type and not being a part of this invention need not be further described. The box 5 is preferably made of brass or other non-corrosive metal and has a metallic bottom 7 and a transparent top or cover 8 which is held in place against the flange 9 by the plate 10 as illustrated in Fig. 2 thus making a substantially dust proof receptacle for the indicating mechanism.

The several rotation counters or indicators on the shafts 1, 2 and 3 may be of any suitable and appropriate type of rotation counters but preferably are as herein shown consisting of the well known "Veeder type," with certain improvements, being actuated successively through a series of internal star wheels. A brief description of the indicator on the shaft 2 will suffice to explain the indicators, on each of the shafts. Referring to Fig. 3 the shaft 2 is suitably journaled in the hub 4 in the side of the box 5, and in the partition 6 through the bearing therein of the hub 11. The taper pin 12 passes through the hub 13 of the first or driving ring 14 securing it to the shaft 2. The hub 11 comprises a loose sleeve supporting the shaft 2 and carries a barrel 15 on which the several indicating rings are supported and may slide, said barrel portion being united to the sleeve or hub 11 by a flange 16 as shown in Fig. 3. The barrel 15 is prevented from moving with the shaft 2 by engagement of the set screw 17 passing through a suitable aperture in the flange 16 and being tapped into a threaded socket bored in the partition 6. A washer 18 interposed between the flange 16 and partition 6 acts to hold the barrel in longitudinal position. A stud 19, also supported in the flange 16 carries the several star wheels which actuate the successive indicating rings. The first indicating or driving ring 14, which is rotated with each revolution of the shaft 2, has two hardened steel teeth 20 and 21 on its inner periphery as indicated in Fig. 6 which teeth engage and actuate the first star wheel 23 moving it the space of one number during each complete rotation of the driving ring 14. The star wheel 23 being loosely mounted on the stud 19 and having its teeth in mesh with the internal gear on the adjacent indicating ring 24 will move said ring the space of two teeth or one number during each complete revolution of the driving ring 14 as will be readily understood. The ring 24 is similarly provided with two teeth to actuate the next adjacent star wheel 25 moving it the space of one number for each complete revolution of the ring 24 said star wheel 25 being in turn in mesh with the teeth of the next adjacent indicating ring 26. This arrangement is substantially similar to that of the well known rotation counters of the "Veeder type" as already mentioned excepting that in the "Veeder type" the indicating rings are mounted interiorly of a casing which protects them. My improved construction is of special advantage in a rotation counter and indicator for marine work as, by providing the indicating rings outside of their supporting member I am enabled to use non-corrosive material for the exterior of said rings, which also will enable the engraving and lettering to be easily performed, and which allows each indicating ring to have its inner rib 27 of hardened steel for better wearing and to more accurately retain its exactness of form than would be possible were the entire ring made of non-corrosive metal. Preferably the teeth 20 and 21 of each indicating ring are of tempered steel and are fitted into corresponding sockets therefor in the rib portion 27 of each ring. By making the various parts of the indicating rings of the best material for the respective uses to which they are severally put,—I am able to produce a counter which can be manufactured advantageously and assembled with great nicety so that, when so assembled, it will act with absolute accuracy and last indefinitely, being almost indestructible and requiring no readjustments.

The arrangement and construction of all the counters are similar to that on the shaft 2 just described and are similarly actuated. The three counters on the shafts 1, 2 and 3 will count the rotations of their respective shafts and in order to count and indicate the average number of revolutions of the said three shafts I provide a similar counter and indicator on a shaft 28 suitably mounted in journal bearings 29 and 30 arranged in the side of the box 5 and the partition 6 respectively, as indicated in Fig. 1. This average counter and indicator is actuated by the sprocket wheel 31 which is secured to the shaft 28 by a taper pin 32 passing through the shaft and hub of the sprocket wheel. The mechanism to determine and to transmit the average of the three indicators on shafts 1, 2 and 3 to the sprocket wheel 31 and hence to the average indicator on the shaft 28 will now be described. It will be noted that the partition 6 in the box 5 is positioned slightly to one side of the center and this enables the compensating, differentiating and transmission mechanism to be located substantially in the central portion of the box 5 and midway between the outside bearings of the indicator shafts. The shafts 1 and 2 may be conveniently journaled in their butting end portions (see Fig. 13) and the shaft 2 having a reduced portion to engage a correspondingly bored socket in the shaft 1 and preferably a bushing 33 is interposed between the bearing portions and the shafts. A gear wheel 34 is loosely mounted on the shafts 1, and 2 at the interconnected joint just described which gear has a radially mounted pinion 35 of a greater diameter than the width of the gear wheel 34, which pinion meshes with beveled gears 36 and 37 pinned to the shafts 1 and 2 respectively. It will be understood that the beveled pinion 35 is positioned in a suitable aperture 38ª in the gear wheel 34 as is illustrated in Fig. 2. Rotation of the shaft 2 in either direction will rotate the gear 34, when the shaft 1 is at rest, through the engagement of the beveled gear 37 with the pinion 35, moving the wheel 34 at a rate of speed equal to one-half the rate of speed of said shaft 2, as the pinion 35 is in the radial center of the said wheel 34 and therefore the beveled wheels 36 and 37 are equal distances from the central diameter of the wheel 34 which passes through the axis of the pinion 35. If the shaft 1 is also being rotated in the same direction and at the same speed with that of the shaft 2 it will be readily seen that the gear wheel 34 will be also rotated at an equal speed through the engagement of both gears 36 and 37 with the pinion 35 and consequently the pinion 35 will be held rigidly, relatively with the gears 36 and 37 and consequently the wheel 34 will be positively rotated as just explained. If the shaft 1 for example is being rotated in one direction and the shaft 2 in the reverse direction and both are rotating at the same rate of speed the wheel 34 will remain stationary as the pinion 35 will simply be rotated through its engagement with the gears 36 and 37, which gears would also be moving in opposite directions. As the gear 34 is intended to transmit the average resultant number of revolutions of the shafts 1 and 2, if said shafts, as just mentioned are rotating in opposite directions there would be no resultant average, and the gear 34 would be at rest. However, if the shaft 2 for example is being rotated in one direction and the shaft 1 is at rest the gear 34 moves at a rate of speed equal to one half that of the shaft 2 and hence makes one complete revolution during two complete revolutions of the shaft 2. And similarly if the shaft 1 is being rotated at the same speed and the same direction as the shaft 2 then the resultant average transmitted by the gear 34 will constitute one complete revolution of said gear 34 with each revolution of the shafts 1 or 2 which, under this condition would be moving together practically as a solid shaft. It will also be readily appreciated that, for example, where the shaft 2 is moving in one direction at a given speed and the shaft 1 in the reverse direction at a less speed the wheel 34 will be actuated proportionately in the direction of rotation of the shaft 2, the difference in speed between the gear wheel 36 and the wheel 37 being the only movement transmitted to the wheel 34. Consequently the arrangement I have shown of gears 36 and 37 engaging at diametrical opposite points with the teeth of the pinion 35 which pinion is pivoted to the gear 34, constitutes a compensating device to compensate for and to transmit the resultant average number of revolutions of the shafts 1 and 2.

In the embodiment of the invention shown in Fig. 1 the gear 34 actuates the average counter on the shaft 28 through the engagement with the differential gear to be described on the shaft 3 and thence through the sprocket wheel 31, but in the form illustrated in Fig. 14 the gear wheel 34 may be connected directly, or through an idler to preserve the same direction of movement with the shaft 28 and the average counter thereon.

Referring to the invention as applied to three rotating shafts, shown in Fig. 1, the shaft 3 carries a beveled gear 38 pinned thereto, and also carries a sleeve 39 on which sleeve is a sprocket wheel 40. Loosely mounted on the sleeve 39 is a differentiating gear wheel 41 comprising peripheral teeth 42 and beveled teeth 43. The diameter of the wheel 41 and of its peripheral teeth 42 is the same as that of the gear 34 and is intended to be actuated by said gear 34 through the idler wheel 44 (see Fig. 1) mounted on a shaft 45 and held between collars 46 and 47. It will thus be seen that the rotation of the wheel 34 will be exactly transmitted and in the same direction to the wheel 41 which wheel however is loosely mounted on the sleeve 39. Secured to the sleeve 39 is a clamp 48 having a clamping screw 49 and carrying a stud 50 on which stud is mounted double intermediate gears of different diameters 51 and 52, the latter being in mesh with the gear wheel 38 on the shaft 3 and 51 being in mesh with the beveled teeth 43 on the wheel 41 as clearly indicated in Fig. 12. Actuation of the gear 34 as previously explained will transmit the average rotation and speed of the shafts 1 and 2 through the idler 44 to the wheel 41 and by the wheel 41 will be transmitted through its engagement with the teeth 51 on the stud 50 to the sprocket wheel 40. A sprocket chain 53 connects the sprocket wheel 40 with the sprocket wheel 31 both being of the same size and consequently actuating the shaft 28 and the counter and indicator carried thereby in the same direction and speed as that of the wheel 40. Actuation of the shaft 3 will also rotate the sprocket wheel 40 through engagement of the gear 38 on said shaft with the teeth 52 and the connection thereof with the sleeve 39 carrying said sprocket 40 and in order to properly average and to transmit the resultant number, speed and direction of the shafts 1, 2 and 3 the gears 43, 51, 52 and 38 are proportioned in the proper relationship so that the actuation of any one of the three shafts, while the others are at rest, will rotate the sleeve 39 and consequently will operate the counter and indicator on the shaft 28 in the proportion of 1 and 3. Thus a complete revolution of the shaft 2 for example will rotate the shaft 28 and the counter and indicator thereof one-third only of a revolution. Similarly the rotation of the shaft 3 during one complete revolution while the others are at rest, through the engagement of the gear 38 and the intermediate gears 52 and 51 and the beveled teeth 43 on the wheel 41, will rotate the shaft 28 one-third only of a revolution, and consequently the rotation of shafts 1, 2 and 3 all in the same direction and at the same speed will actuate the counter and indicator on the shaft 28 one complete revolution for each revolution then made by said shafts 1, 2 and 3, each shaft serving to turn the average counter a third of a revolution. The operation of my invention is absolutely accurate and automatically, instantly and continually produces, counts and indicates the average number of rotations of the three shafts irrespective of their rates of speed or directions. The mechanism just described will, of course, not only produce the resultant average for the number and speed of the rotations of the shafts 1, 2 and 3 when they are being rotated in the same direction but also if one of said shafts is rotating in the reverse directions or if all are going at different rates of speed. The proper proportions having been produced between the actuating gears, all possible variations of speed, directions and number of rotations will be necessarily averaged and indicated on the shaft 28.

The further important features of the invention whereby the average number of revolutions per minute of a plurality of rotating shafts is counted and indicated, either during a minute, or during a less or a greater period than a minute, will now be described. The shaft 28 being actuated through the sprocket wheel 31 and the sprocket chain 54 at the average produced by the mechanism comprising the interconnected gears operating the sleeve 39 and the sprocket 40, the average revolutions per minute can be taken directly from this shaft. Pinned to the shaft 28 is a gear 55 in mesh with a coöperating gear 56 mounted on a sliding rod 57. This rod is suitably journaled in a bracket 58 and a sleeve 59 in the bearing in the side of the box 5, extending beyond said box and carrying a thumb nut 60. Mounted adjacent to the rod 57 is an indicator comprising a series of indicating wheels generally similar to the counter already described and mounted on a stud secured to the side of the box 5. The first or driving ring of this indicator carries two gears 61 and 62 suitably keyed thereon. The gear wheel 61 being arranged to be in mesh with the gear 56 on the rod 57 when said rod is manipulated to slide the gear 56 and 61 into operative connection. The gear 56 is of proportionate width so as to be in engagement with the gear 55 at all times within the limit of movement of the rod 57, and the rotation of the shaft 28 will be transmitted through said gears 55, 56 and 61 to the indicator just mentioned, the wheel 61 being of such proportion to the gears 56 and 55, (which latter are of equal diameter) so that the indicator will be rotated at twice the speed of rotation of the shaft 28 and in the same direction therewith. Therefore this indicator will show in thirty seconds, the number of average revolutions per minute of the shafts 1, 2 and 3. In order to also determine the average number of revolutions per minute for a greater length of time than one minute, as for example in five minutes, the rod 57 carries a gear 63 adapted to engage the gear wheel 62 when the rod 57 is moved or slid along so as to bring the wheel 62 into mesh with the wheel 63. These wheels are of proper proportion so that five revolutions of the shaft 28 will rotate the gear 62 and consequently the indicator, during one revolution and therefore the average number of revolutions for one minute during a period of five minutes will be counted by the indicator showing what is the average revolution per minute during the said period of five minutes' time. Any predetermined ratio of time may be counted by providing properly proportioned gear wheels other than merely for thirty seconds, and for a five minute interval, although these two are the ones I have found to be most desired in the present uses to which my invention has been applied. In order to hold the rod 57 where moved so that the desired gear will be actuating the indicator I have provided a simple and efficient spring locking device illustrated in Figs. 1 and 10. The rod 57 has a transversely extending pin 64 near its inner end which extends into a notched slot in the rack 65 secured to the side of the box 5. A spring 66 normally presses against the pin 64 to hold it upwardly into engagement with the slot in the member 65 or into engagement with the walls of said slot if the pin is out of the notch. When the rod 57 is slid so that the gears 56 and 61 which are in mesh with the pin 64 will be at one end of the slot in said member 65, when gears 63 and 62 are in mesh the pin 64 must be at the other end of said slot and when said pin is in the notch the indicator is disengaged from operative connection with the gears on the rod 57, and may be reset. Any suitable resetting device may be employed but preferably I use the novel form as herein shown.

The average counter and indicator for the revolutions per minute will preferably comprise only three indicating rings as one to a thousand revolutions per minute may be counted on three rings and this speed is seldom exceeded in propelling shafts, although of course any number of revolutions per minute may be counted by providing a proper number of rings. In order to reset the devices the first or driving ring may be quickly turned through the thumb piece 67 projecting outside the box 5 and keyed to the supporting shaft of said indicator which shaft has the wheels 61, 62 on its inner end. In order to reset the third indicator ring I have arranged the sleeve 59 with a thumb piece 68 on its outer end and the gear wheel 69 on its inner end which is arranged to be meshed with a gear wheel 70 secured to said third indicating ring so that manipulation of the thumb piece 68 will rotate the third ring of the indicator. A spring 71 secured to the side of the box 5 normally throws this resetting mechanism out of mesh with the third ring of the indicator. If desired a brake 72 may be fixed on the rod 57 so positioned on the rod 57 that it will bear against the gear wheel 62 when the pin 64 is forced into the notch in the member 65 and hence stop the rotation of the indicator since the actuating mechanism is disconnected therewith.

I have also shown herein one form whereby my average counter and indicator and the counter for indicating the revolutions per minute may be applied to a series of four shafts. As the indicator shaft, rings, etc., in the case of four shafts would be like those shown in Fig. 1,—I will simply describe, and have illustrated in Figs. 14-17, the mechanism connecting the four individual shafts to the average counter and indicator shaft for the entire series.

Referring to Fig. 14 the end portions of shafts 73, 74, 75, and 76 will be understood to be the shafts carrying individual counters and indicators similar to those already described in connection with shafts 1, 2 and 3. The shaft 77 is that carrying the average counter and indicator and corresponding to the shaft 28 already described. The compensating mechanism for the shafts 75 and 76 are indicated clearly in cross section in Fig. 16 and comprise a beveled gear 78 keyed to the shaft 75, a similar beveled gear 79 of equal diameter keyed to the shaft 76 and an intermediate beveled gear 80 meshing with each of said gears 78 and 79 and being radially mounted in a sprocket wheel 81. This arrangement is similar to that already described in connection with the compensating gear for the shafts 1 and 2. Preferably the shafts 75 and 76 would have a bearing in the joining end portions similar to that illustrated in Figs. 13 and 15. The actuation of shafts 75 and 76 will result in the transmission of the average number of revolutions to the sprocket wheel 81 in a similar manner to that above mentioned in connection with the shafts 1 and 2. The sprocket wheel 81 is connected by a sprocket chain with a corresponding sprocket wheel 82 of equal diameter on the shaft 77 and will be further explained. The actuation of the shafts 73 and 74 and their respective gear wheels 83 and 84 and the actuation thereby, through the beveled gear 85, carried by the gear wheel 86, is also similar to that just described in connection with the shafts 75 and 76 and it is believed that their operation will be readily understood. The gear 86 meshes with an idler 87 mounted on a suitable shaft 88 between fixed collars and is also in mesh with a gear wheel 89 mounted loosely on the supporting shaft 77 as indicated in Fig. 15. The gear wheel 89 and the sprocket wheel 82 are of similar diameter and each is intended to rotate at the average of two shafts produced by the respective connections therewith. Secured to the shafts 77 between the gears 82 and 89 by a screw 90 is a stud 91 carrying a beveled gear 92 which gear is of proportionate diameter to engage at diametrically opposite points thereon, the correspondingly beveled gears 93 on the wheel 89 and 94 on the wheel 82. This arrangement is a compensating device, so that the rotation transmitted through the sprocket wheel 82, when the gear 89 for example is at rest, will rotate the average counter on the shaft 77 through only one half a revolution during a complete revolution of the sprocket 82. It will be remembered that a complete revolution of either of the shafts 75 or 76, while the other is at rest will result in only one half a revolution of the sprocket wheel 82 as has been already explained in connection with the shafts 1 and 2. Similarly a complete revolution of the gear wheel 89 serves only to rotate the shaft 77 through one half a revolution so that it will be readily understood that the average indicator actuated by the shaft 77 will be rotated through one fourth of a revolution during each complete revolution of any one of the individual shafts 73, 74, 75, or 76 while the others are at rest. Therefore a proper average for all four of said indicator shafts is shown by the counter carried by the shaft 77.

While the gear wheel 89 and sprocket wheel 82 are normally arranged to be loosely rotatable on the shaft 77 I have provided a socket 95 through the hub of the wheel 89 and a similar set screw 96 for the wheel 82. If the set screw 96 is shifted to the socket 95 and set to hold the wheel 89, the average number of rotations and rate of speed of the two shafts 73 and 74 only will be transmitted to and indicated by the average counter and indicator on the shaft 77. Similarly if the set screw 96 is shifted to the socket 95 on the hub of the wheel 82, then the average of the two other shafts 75, and 76 only will be counted and indicated whether the other shafts are in motion or not.

In order to suitably cover the box or receptacle 5 a glass cover is provided as indicated in Fig. 2 and the plate 10 is also provided as shown in Fig. 2 and Fig. 18 and with suitable openings to permit the readings to be taken from the several individual counters and the average counter as well as from the indicator showing the revolutions per minute. The numbers 1, 2 and 3, indicating the respective engines 1, 2 and 3 to which the three shafts illustrated in Fig. 1 have been described as connected therewith may conveniently be shown on the plate 10 and preferably such numbers are interchangeable as it may be more convenient to connect the number 1 engine for example with one of the indicators near the right of the box than that at the left as now shown in the drawings. If desired a scale supported on an arm 97 and arranged in proximity to the indicator showing the revolutions per minute may be provided whereby the fractions of revolutions per minute may be more accurately read.

It should be noted that the rotation counters and indicators on each of the individual shafts 1, 2 and 3, as well as on shafts 73, 74, 75, and 76 are unnecessary for the operation of the average counter and indicator as well as unnecessary for the operation of the indicator showing the number of revolutions per minute. It is however convenient to have each individual shaft equipped with such a rotation counter and I have therefore shown them thus provided.

The operation of my invention has already been described and it is believed that its advantages will be readily appreciated. The invention provides an indicator capable of indicating the average revolutions per minute of two or more moving parts, and of counting and showing such average instantly, automatically and continuously,—without delay, without mathematical calculations of any kind and with absolute exactness and accuracy. This resultant average is obtained irrespective of the direction or of the rate of rotation of any one individual member or whether all or less than all members are in motion. All three or more members may be moving at different rates of speed and yet the resultant average is automatically determined and indicated. The provision of such means is believed to be entirely novel and it is therefore desired to claim the same broadly, as applied to a plurality of moving members.

Furthermore, the feature of the counting means to indicate the revolutions per minute for any given length of time whether shorter or longer than a minute and with a choice of such periods operable at will is believed to be absolutely novel as applied to any one rotation counter, and, therefore, this feature of the invention is not to be limited to an average counter for a plurality of moving members but is intended to be claimed broadly as well as in combination with such an average counter.

Having described my invention, what I claim as new and desire to secure by Letters Patent is:

1. In apparatus of the kind described, the combination with operative connections from three propelling engines of a ship, of separate counter mechanism for each engine to indicate the number of revolutions of the respective engines, and an average indicator adapted to be connected with each of the counter mechanisms for each shaft together with means to compensate, automatically, for proportionately different rotative movements of any of said propelling engines and to proportionately actuate said average indicator.

2. In apparatus of the kind described, the combination with operative connections from three propelling engines of a ship, of separate counter mechanism for each engine to indicate the number of revolutions of the respective engines, and an average indicator adapted to be connected with each of the counter mechanisms for each shaft together with differential gearing interposed between the propelling engines and the average indicator, said gearing being constructed and arranged to automatically compensate for varying speeds and dissimilar directions in the propelling engines and to transmit the resultant average only of all of said engines to the average indicator.

3. In apparatus of the kind described, the combination with operative connections from three propelling engines of a ship, of separate counter mechanism for each engine to indicate the number of revolutions per minute of the respective engines, and an average indicator adapted to be connected with each of the counter mechanisms for each shaft together with differential gearing arranged to compensate, automatically, for proportionately different rotative movements of any of said propelling engines and to proportionately actuate said average indicator.

4. In a device of the class described, a rotation counter adapted to indicate the average rotations of three or more individually moving shafts capable of varying rates of speed and in dissimilar directions, and a differential gearing connected to each one of said individually actuated shafts, said differential gearing comprising connections permitting the dissimilar rates of movements of any two of said shafts to be equated and the reverse direction of movement of a shaft to be deducted, and the resultant average rotative movement of all of said shafts to be transmitted to said average indicator.

5. In a device of the class described, a rotation counter adapted to indicate the average rotations of three or more individually moving shafts capable of varying rates of speed and in dissimilar directions, and a differential gearing connected to each one of said individually actuated shafts, said differential gearing including a rotatable sleeve carrying an idler meshing with two independently rotatable gears actuated by said shafts permitting the dissimilar rates of movements of any two of said shafts, while another shaft is stationary, to be equated, and the resultant average rotative movement of all of said shafts to be transmitted to said average indicator.

6. In a device of the class described, an average indicator for a plurality of diversely moving members, consisting in three or more moving parts, connections from each of said moving parts with respective prime movers, compensating means connected with two of said moving parts and adapted to show the combined average number of revolutions of said two parts, in combination with differential means arranged to be actuated by a third moving part jointly with said compensating means and connections between the rotation counter and said differential means whereby the average number of revolutions of all of said moving parts is transmitted to the rotation counter.

In testimony whereof, I have signed my name to this specification, in the presence of two subscribing witnesses.

HENRY H. CUMMINGS.

Witnesses:
JAMES R. HODDER,
R. J. HERSEY.